United States Patent [19]

Kollin et al.

[11] Patent Number: 4,774,655

[45] Date of Patent: Sep. 27, 1988

[54] SYSTEM FOR RETRIEVING INFORMATION FROM A PLURALITY OF REMOTE DATABASES HAVING AT LEAST TWO DIFFERENT LANGUAGES

[75] Inventors: Richard P. Kollin, Wynnewood; Gerald A. Francis, Bala Cynwyd; Craig Tiano, North Hills, all of Pa.

[73] Assignee: Telebase Systems, Inc., Bryn Mawr, Pa.

[21] Appl. No.: 664,167

[22] Filed: Oct. 24, 1984

[51] Int. Cl.[4] .......................................... G06F 15/74
[52] U.S. Cl. .................................................. 364/200
[58] Field of Search ................. 364/200, 900 MS File

[56] References Cited

U.S. PATENT DOCUMENTS

| | | | |
|---|---|---|---|
| 3,560,936 | 2/1971 | Busch | 364/200 |
| 3,751,670 | 8/1973 | Grodner | 358/86 |
| 4,153,931 | 5/1979 | Green et al. | 364/200 |
| 4,164,025 | 8/1979 | Dubnowski et al. | 364/900 |
| 4,207,598 | 1/1980 | Reich | 358/257 |
| 4,303,941 | 12/1981 | Marti | 358/147 |
| 4,318,184 | 3/1982 | Millett | 364/900 |
| 4,337,485 | 6/1982 | Chambers | 358/147 |
| 4,395,780 | 7/1983 | Gohm | 455/607 |
| 4,433,392 | 2/1984 | Beaven | 364/900 |
| 4,450,477 | 5/1984 | Lovett | 358/86 |
| 4,466,060 | 8/1984 | Riddle | 364/200 |
| 4,525,779 | 6/1985 | Davids et al. | 364/200 |
| 4,553,222 | 11/1985 | Kurland et al. | 364/900 |
| 4,555,774 | 11/1985 | Bernstein | 364/900 |
| 4,604,686 | 8/1986 | Reiter et al. | 364/200 |

OTHER PUBLICATIONS

Mead Data Central "UBIQ TERMINAL", LEXIS, NEXIS Operator Reference Manual 1982, pp. 1–6.
Mead Data Central "REFERENCE MANUAL", 1985, pp. 1, 13–21, 44–50.
LEXPAT Quick Reference 1982.
"Sci-Mate Software System", Institute for Scientific Information, 1985.
"Current Comments", Institute for Scientific Information, Sep. 23, 1985 and Mar. 17, 1986.
Dialog Information Services, Inc., "To Finish in First Place".
Business Computer Network-letter (two pages).

*Primary Examiner*—Raulfe B. Zache
*Assistant Examiner*—Emily Y. Chan
*Attorney, Agent, or Firm*—William H. Eilberg

[57] ABSTRACT

A system enables a user to retrieve information from a plurality of commercially available databases. The user gains access to the system with a personal computer equipped with a modem, or with any other terminal capable of sending and receiving data over telecommunications lines. The system presents the user with a sequence of menus which ask the user to specify an area of interest. The choices presented to the user are programmed to cover virtually the entire field of human knowledge. After the user has chosen the area of interest, the system automatically selects a database to be searched. The user then enters a specific search request, and the system translates the format of the request into a format which is appropriate for the database selected. The system establishes communication with the database, downloads the information received from the database, and terminates the link with the database. The user is then able to browse electronically through the information received, without incurring the added expense of maintaining communication with the database.

15 Claims, 4 Drawing Sheets

DATABASES

A — PHYSICS & CHEMISTRY ABSTRACTS
B — MEDICAL DIGESTS
C — GENERAL SCIENTIFIC MAGAZINES
D — NEW YORK TIMES SCIENCE ARTICLES
E — US PATENT ABSTRACTS

Fig. 3b

SYSTEM FOR RETRIEVING INFORMATION FROM A PLURALITY OF REMOTE DATABASES HAVING AT LEAST TWO DIFFERENT LANGUAGES

BACKGROUND OF THE INVENTION

This invention relates to the field of information retrieval. More specifically, the invention comprises an apparatus and method for obtaining information from any one of the multiplicity of commercially available databases. The invention makes such information retrieval simple, efficient, and economical.

It has long been recognized that information of any kind, including stored data, can be transmitted by telecommunications technology. One example of an information retrieval system for providing data to a plurality of subscribers is shown in U.S. Pat. No. 4,450,477. Other examples of systems for transmitting data to subscribers in remote locations are given in U.S. Pat. Nos. 4,337,485, 4,303,941, 3,751,670, and 4,395,780. The main disadvantage of the system shown in U.S. Pat. No. 4,450,477 is that it requires a complete cable television system for its operation. While all of the cited patents deal with storage and transmission of data, none addresses the special problems encountered in dealing with a multiplicity of commercially available databases.

There are hundreds, if not thousands, of commercial databases now in existence. As used herein, the term "database", or "commercial database", means a collection of data, usually concerning one particular field or subject, which is stored in the memory of a computer (or on peripheral storage devices), and which is accessible to a plurality of users, the users being situated in remote locations. The users establish contact with the databases through telecommunication lines. Normally, the users pay a fee for the service, the fee being based on the amount of time spent in communication with the database.

Until comparatively recently, in order to have access to a commercial database, the user needed a special terminal, which generally was fairly expensive. In recent years, with the proliferation of personal computers in homes and offices, the number of persons having equipment capable of communicating with outside databases has increased dramatically. Now, anyone with a personal computer, a telephone, and a modem (a device for converting the digital signals of the computer into analog signals capable of being transmitted over telephone lines, and vice versa) can gain access to any commercial database. The huge potential market for such information services has contributed to the dramatic increase in the number of commercial databases.

Unfortunately, each commercial database has a "language" of its own. That is, for each database, there is a different set of syntactical rules governing the formulation of search requests. A user who desires to search in a large number of databases must learn all the different languages for the databases. Although different databases often have languages which are similar in some ways, the differences that remain, subtle as they may be, cannot be ignored. The user must therefore maintain a working knowledge of each such language. If the user is not thoroughly familiar with the database language before establishing communication with that database, the user may waste valuable time in attempting to formulate a search request correctly. Such a procedure is obviously an expensive one, as the fee for using commercial databases is linked to the time spent "on-line" with the database.

The expense incurred in using a commercial database can be divided, in general, into two components. There is a charge made for the "search" time, which is time spent actually searching the database for documents fulfilling the search request. And there is a charge for "browse" time, which is the time spent in reviewing the documents retrieved by the search. Although some database vendors may charge less for browse time than for search time, the user almost invariably requires much more browse time than search time. Because the user must maintain communication with the database in order to browse, the cost of even a straightforward search can become prohibitive.

Another basic problem resulting from the large number of commercial databases is that many potential users do not know what databases are available. Unless one is a skilled reference librarian in the ever-changing world of commercial databases, one is unlikely to be aware of all the databases which may contain the solution to a researach problem. This problem affects not only the person who is inexperienced in the use of commercial databases, but also the expert user whose knowledge of new databases may not be current.

The present invention solves all of the problems described above, by providing a new apparatus and method for communicating with a large number of commercial databases. The invention eliminates the need for the user to know what database should be searched. The invention also makes it unnecessary to learn more than one language for formulating search requests. The searches performed with the system of the present invention are, on average, considerably less costly than searches done by conventional methods.

The present invention also helps those persons who are already expert in the use of commercial databases, by reducing the number of commands necessary to gain access to a wide variety of databases. With the present invention, the even the expert user can save valuable time in performing searches.

SUMMARY OF THE INVENTION

The present invention, in its simplest form, comprises one or more programmed digital computers connected, by suitable modems, to incoming telephone lines, from users, and to outgoing telephone lines, to various databases. The user dials the telephone number of the system, which, after asking for the user's credit card number, presents the user with a series of questions concerning the area in which the user wishes to search. The questions are pre-programmed, according to a predetermined decision "tree", and are designed to provide the user with choices that span virtually the entire range of human knowledge. After the user responds to a given question, the systems asks another question, in order to determine more precisely what database(s) would be most appropriate to solve the user's problem.

Based on the user's responses to the system's inquiries, the system chooses a commercial database that is believed to be most likely to contain the solution to the user's research problem. The computer then asks the user for a search request. A search request comprises a word, or a group of words connected by logical operators. The object of the search is to retrieve all documents in the database which contain that word or group of words. The system requires the user to be familiar with a small number of logical operators. If the user is not familiar with these, the system automatically provides help menus to the user. A working knowledge of the single, simple language used by the system is sufficient to communicate with any database accessible to the system.

After the user has entered a search request, the system automatically translates that search request into the specific language or format required by the database to be searched. Next, the system automatically dials the telephone number of the selected database, and presents the search request to that database. When the searching is complete, and documents have been retrieved, the system "downloads" the documents into its own memory and then terminates the communications link with the database. At this point, the user is free to browse through the documents obtained from the search. Thus, while browsing, the user is "off-line" with respect to the database. However, the information presented on the screen to the user appears the same as if the browsing were being done "on-line".

The system also allows the user to make further searches or refinements of the original search. Also, the system may make recommendations to the user as to possible alternative databases which, though not originally selected, might contain relevant information.

The system also comprises options whereby a user may select a particular database to be searched. The system will still automatically translate the user's search request. The user is also given the option of searching on-line in a particular database. In the latter case, applicable only to expert users, the system assumes that the user knows the language of the selected database, and does not translate the search request.

It is therefore an object of the present invention to provide an information retrieval system which allows a user to obtain information from a variety of commercial databases.

It is another object of the invention to provide a system as described above, wherein the system, after interactive discourse with the user, selects a database that is most appropriate to the user's needs.

It is another object of the invention to provide a system as described above, wherein the system eliminates the need to memorize the individual language of each commercial database.

It is another object of the invention to provide a system as described above, wherein the user is not required to memorize a password for each of the databases which may be searched.

It is another object of the invention to provide a system as described above, wherein the system automatically translates a search request, formulated by the user in one easily-learned language, into the language or format required by the database which the system has selected for searching.

It is another object of the invention to provide a system as described above, wherein the period of direct communication with the commercial database is limited to the time during which the database is actually being searched, plus the time required to download the retrieved information into the system.

It is another object of the invention to provide a system as described above, wherein the user may browse through the documents retrieved in the search, without the need to maintain a communications link with the commercial database.

It is another object of the invention to provide a system as described above, wherein the system automatically provides the user with the names of alternative databases, if any, which might contain solutions to the user's search problems.

It is another object of the invention to provide a system as described above, wherein the user may select a particular database to be searched, and wherein the system nevertheless translates the search request of the user into the language appropriate for that database.

It is another object to provide a system as described above, wherein the system allows the user to search on-line in each of many dtabases, without the need to enter a plurality of passwords, and wherein all the searching can be charged to one credit card.

Other objects and advantages of the present invention will be apparent to those skilled in the art, from a reading of the following brief description of the drawings, the detailed description of the invention, and the appended claims.

DETAILED DESCRIPTION OF THE INVENTION

Figure 1:
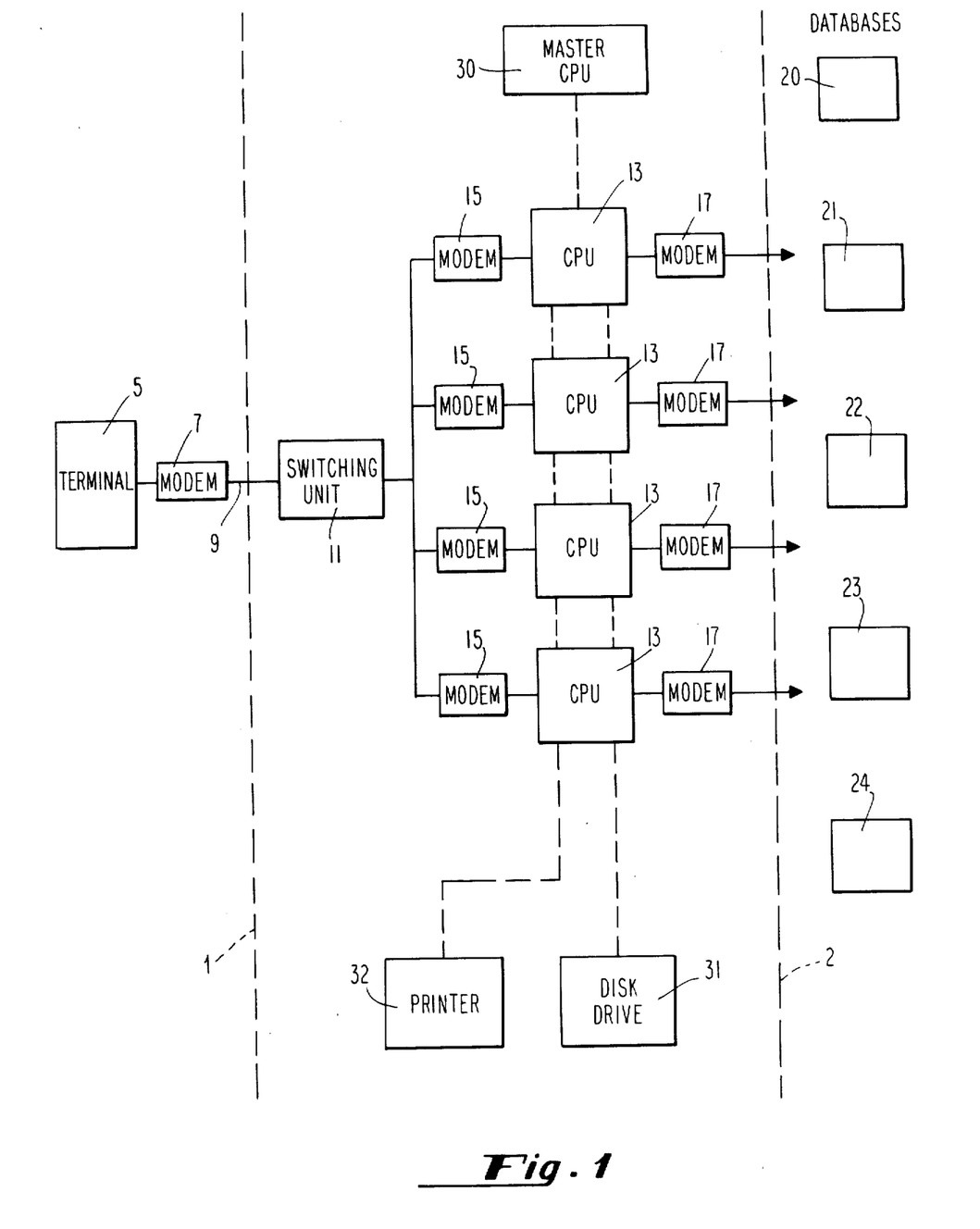
FIG. 1 is a schematic block diagram illustrating the physical components of the present invention.

The physical components of the present invention are illustrated in the schematic block diagram of FIG. 1. The system may be operated from terminal 5, having modem 7. Terminal 5 may be simply a personal computer, or it may be a so-called dedicated terminal (or "dumb terminal"), whose sole capability is to transmit and receive information. Modem 7, which is of conventional design, and is assumed to include a telephone and dialing mechanism, converts the digital signals from the terminal 5 into analog signals suitable for transmission over telephone line 9. Modem 7 also converts incoming analog signals from line 9 into signals having digital format, which can then be interpreted by terminal 5.

When modem 7 dials the telephone number of the system, the call is answered by switching unit 11. Switching unit 11 allocates the call to one of a plurality of identically-programmed computers 13, each computer having an incoming modem 15. Switching unit 11 is of standard design, and is pre-programmed to indicate to the caller if all available computers are currently busy. In the preferred embodiment, computers 13 comprise identical central processing units (CPUs) which may be conveniently arranged in the same housing. Other arrangements are possible, however.

Each computer 13 is connected to an outgoing modem 17. Outgoing modems 17 are also of standard design, and are equipped with automatic telephone dialing mechanisms. Through modems 17, the computers 13 can establish communication, via telephone lines 19, with one of many remote commercial databases, illustrated symbolically as blocks 20, 21, 22, 23, and 24.

Each of the databases 20-24 represents, in general, a separate and independent computer system at some remote location. The information stored in each database may be kept on disks or other storage media, and the searching through the respective databases is governed by the particular computer system for that database. The system of the present invention assumes the existence of such multiple databases, and operates with all or any of them, regardless of the specific configuration of each database computer system. The system communicates with these databases in the same manner as would any other user of such databases.

Connected in parallel to all the computers 13 is master CPU 30. Master CPU 30 is a computer which controls the overall operation of the system. The master CPU continually checks that all computers 13 are operating properly. It also can be programmed, in conjunction with switching unit 11, to guide an incoming user call to the appropriate computer. The master CPU 30 also serves to direct the various computers to retrieve information from disk 31, or to print billing information on printer 32.

The components shown between dotted lines 1 and 2 indicate the components which are "local", i.e. grouped at a central location. The components shown outside the dotted lines are "remote", i.e. located elsewhere. Normally, terminal 5 will be located at a substantial distance from the system, possibly thousands of miles away. Databases 20–24 are also, in general, found in computers located in other places. However, it should be understood that it is possible that one or more of the "remote" components could be physically located near the central location, without impairing the operation of the system. Thus, it is possible to operate the system from a terminal located near computers 13. It is also possible that one or more of databases 20–24 could be located in the same general area. The invention will operate regardless of the physical locations of the remote terminal and the databases.

Figure 2A:
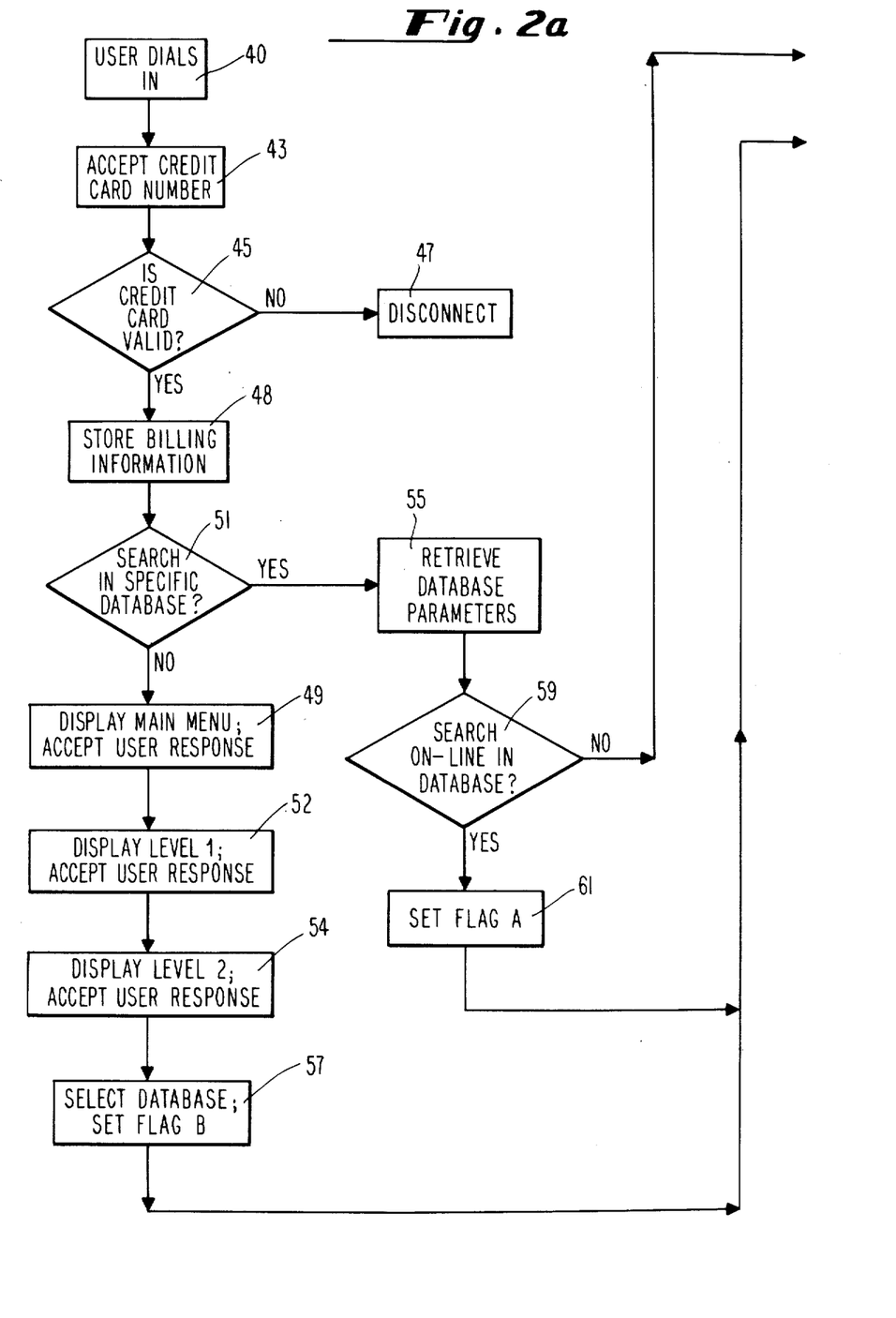
FIGS. 2a and 2b are a flow chart illustrating the programming of the computer used in the operation of the invention.
Figure 2B:
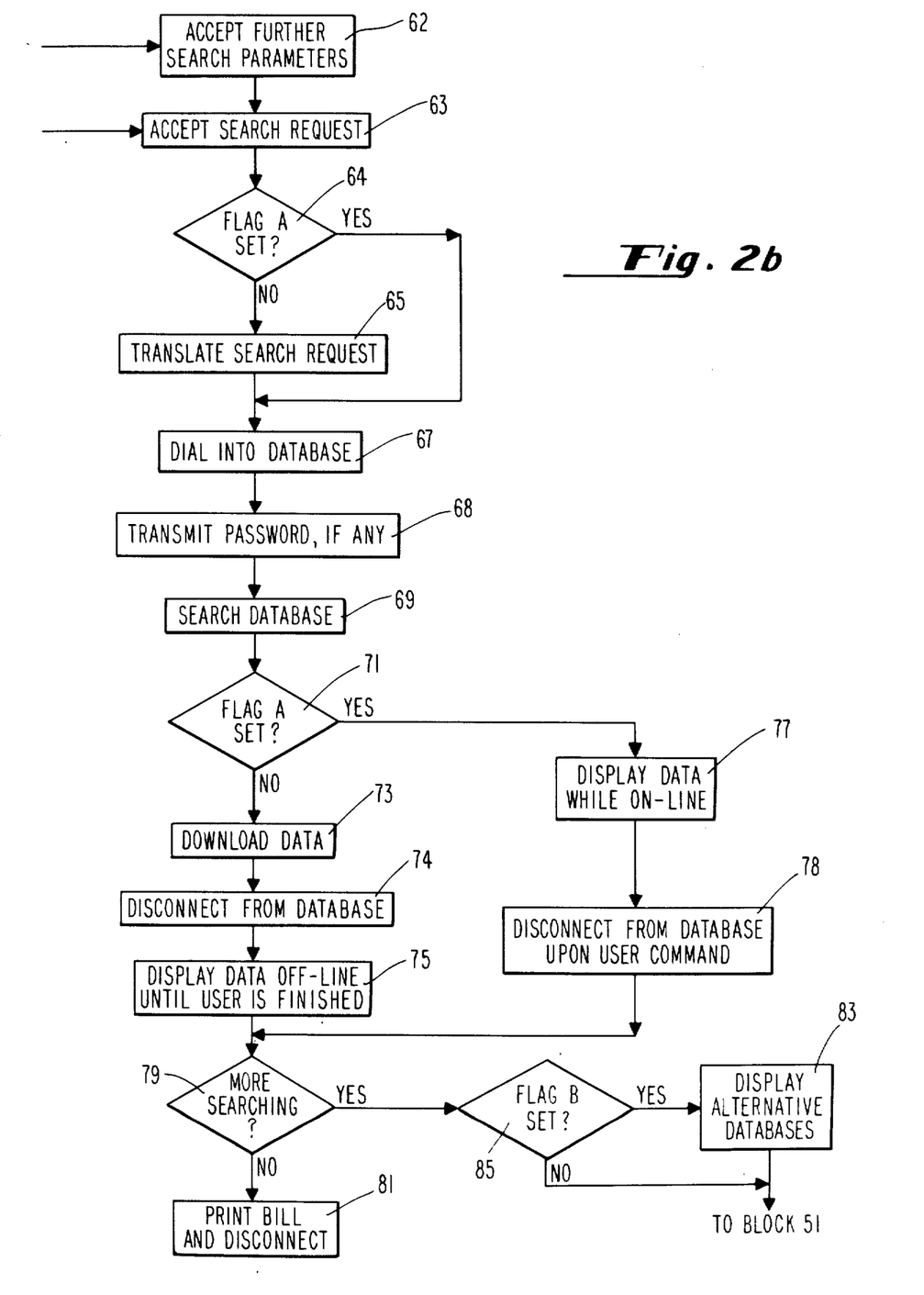

The operation of the invention can be understood with reference to the flow chart of FIG. 2. The user dials the telephone number of the system, as indicated in block 40. The system immediately asks the user for a credit card number, as shown in block 43. The system automatically verifies the validity of the credit card number, in test 45, using conventional credit card verification techniques. If the card number given is not valid, the system automatically disconnects the line, as indicated in block 47. If the card is valid, the system stores billing information, as indicated in block 48, including the customer's name, address, and card number, for later use in printing a bill.

It should be stressed that the only obstacle encountered by the user in entering the system is the need for a valid credit card. There is no need for the user to memorize a password, either for the system or for any of the databases to be searched. Any passwords required by an individual database are stored internally by the system and transmitted when needed, without prompting from the user.

The step of verifying the validity of the credit card, in test 48, may also include the step of monitoring the total charges accumulated by the particular credit card number on a given day. The system may therefore be pre-programmed to allow only a certain dollar amount of searching by a user. This precaution tends to prevent users from exceeding the credit limits of their credit cards. But, more significantly, the system can therefore prevent a user from duplicating an entire database by simply downloading the entire database into the user's computer. By detecting unusually large amounts of use, the system can therefore prevent theft of large commercial databases.

After the user's credit card number has been checked, the system asks, in test 51, whether the user wants to bypass the normal automatic database selection procedure. By answering in the affirmative, the user may indicate to the computer that he or she wishes to search in a particular database, and does not want the database selection to be made automatically by the computer. Also, the user who selects a database in this manner is given the option, in test 59, to search "on-line" in the dtabase. By "on-line", it is meant that the communication link with the database is maintained throughout the search. The term "off-line" means that such link has been terminated.

If the user indicates a desire to select a particular database, the system, in block 55, accepts the name of the database and retrieves, from its memory, the necessary information about that database, including its telephone number, language details etc. If the user also expresses the desire to search on-line, the system, in block 61, sets flag A for later use.

If the user does not indicate, in test 51, the desire to search in a particular database, the system continues with the automated database selection procedure. In block 49, the system displays its main menu, which provides a comprehensive list of areas of knowledge. The user is asked to select one area. The areas listed in the menu are designed to cover virtually every field of human knowledge. Each area listed in the main menu is therefore very broad in scope. It is thus necessary to question the user further concerning the specific field of interest. These further queries are indicated in blocks 52 and 54 as Level 1 and Level 2. Each level comprises another menu, from which the user is asked to select a subdivision of the topic selected from the previous menu. A detailed example of these levels will be explained later. It should be understood that the number of levels may be increased for greater precision of database selection.

Figure 3A:
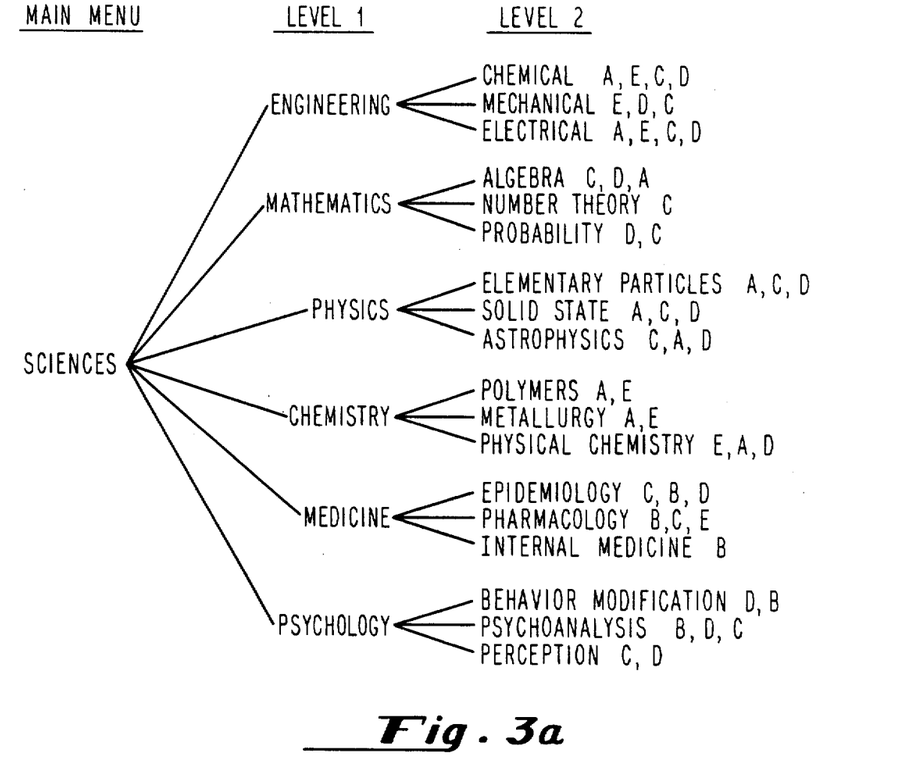
FIGS. 3a and 3b are a chart which illustrates the method by which the present invention automatically selects a database to be searched.
Figure 3B:
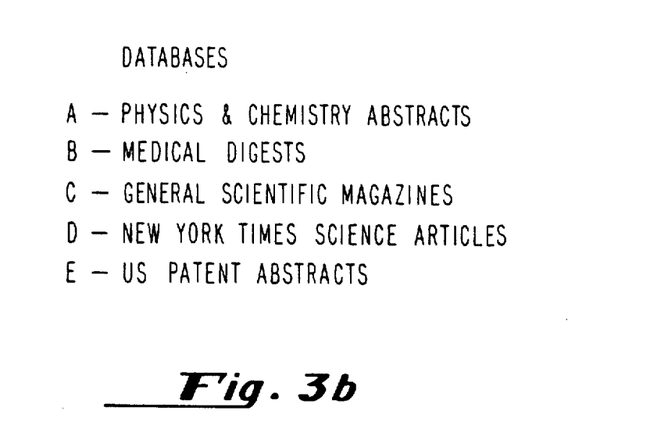

After the user has selected from the main menu and from levels 1 and 2, the system selects a database automatically, in block 57. The specific method of choosing the database to search will be explained later, with reference to the example of FIG. 3. It is an important feature of the invention that, regardless of the field in which the user wants to search, the system will select a database which is considered to be most relevant to the field selected by the user. Of course, the system can select only from the databases which are commercially available. But, as stated above, the large number of databases currently available insures that this limitation is not a serious one.

In block 57, the system also sets flag B, which indicates that database selection has been made automatically by the system, and not by the user.

If the user has chosen to search in a specific database, but does not want to search on-line, the system presents the user, in block 62, with one or more additional menus. These menus give the user the opportunity to elect to search more thoroughly in the database selected. For example, the system can be programmed to allow the user to elect to search more segments of each document in the database than would be available to a user for whom the system makes the database selection. The number of searching options which can be made available to the user in block 62 is quite numerous.

After a database has been selected, either by the automatic means provided by the system, or by the direct choice of the user, the system asks for a search request, as indicated in block 63. Before explaining the operation of the system in receiving and processing the search request, it is necessary to explain the terminology of database searching.

A "search request" comprises a word, or group of words, for which a computer must search in the selected database. In currently available commercial database services, the system searches its files for all occurrences of the word or group of words in the search request, and electronically retrieves all documents containing these words. The system tells the user how many documents have been found, and allows the user to "browse" through the retrieved documents electronically, i.e. by viewing all or part of the documents on the terminal screen.

Virtually all commercial databases allow search requests which contain logical combinations of words. A user can, by including certain prescribed logical symbols, require that the system retrieve only those documents containing both of two specified words. Or the user can ask for documents containing either of two specified words. Depending on the database, the user can enter other modifications to the search request, so as to narrow the search properly. In formulating a search request, however, the user must be careful to obey the rules of syntax unique to the database being searched.

In the present invention, there is one simple set of rules of syntax for search requests. The system automatically translates the search request entered by the user into the language required by the database to be searched. In the preferred embodiment, the present invention allows the user of the following logical symbols in formulating search requests: AND, OR, NOT, ( ), and truncation. When two words are separated by "AND", the system will search the database for documents containing both words (or groups of words) on either side of the "AND" operator. When two words are separated by "OR", the system searches for documents containing either word (or words) on either side of the "OR" operator. The "NOT" operator enables the user to find documents which do not contain a particular word or words. The parentheses operator allows the user to vary the order in which the above operations are performed. And the truncation operator allows the user to search for words beginning with a certain pattern of letters, and ending with any other group of letters.

The user of the present invention enters a search request, as indicated in block 63. The system then tests for the condition of flag A, in test 64. If the flag is not set, the system then translates the search request, in block 65, into the language, or format, appropriate for the database which is about to be searched. The details of the procedure for translation of the search request are illustrated in an example, to be described later.

The system may be programmed to provide the user with "help" menus, to assist the user in formulating the search request. The help menus remind the user of the syntactical rules applicable to all search requests accepted by the system. Thus, with the use of help menus, it is not necessary for the user to memorize even one database language. Of course, the cost of the search will be reduced if the user is already familiar with that one, simple search request language used by the system.

If flag A has been set, indicating that the user wants to search on-line, the system bypasses the translation step. It is assumed that any user who wants to select a database and who wishes to remain on-line with that database is an expert user, and is one who already knows the specific language of that database.

After accepting a search request, and translating it if necessary the system automatically dials the telephone number of the selected database. The number is stored in the memory of the computers 13, as is any password that may be necessary to supply to the database system. Thus, the user need not know the individual passwords for each database. As stated above, the only entry barrier for the user, whether a novice or an expert, is the requirement of a valid credit card. The system transmits the password, if a password is required by that database, in block 68.

The system may be programmed to gain access to the databases through a telecommunications carrier other than the phone system. Such carriers, which are commercially available, allow owners of personal computers, or other terminals with telecommunications capability, to communicate with similar computers in remote locations. If such a carrier is to be used, the system is programmed to dial an appropriate number and to supply whatever additional passwords may be necessary to gain access to the carrier and to the desired database. Regardless of which carrier is used, the user is not required to be aware of any passwords or other similar details. The user sees virtually the same information on the screen as would be seen if the database were being telephoned manually.

Next, the system transmits the translated search request to the database, as shown in block 69. The system waits while the search through the database is in progress. When the system receives a signal indicating that the search is complete, the system determines whether flag A is set, in test 71. If flag A is set, meaning that the user wishes to browse through the retrieved documents while on-line, the system proceeds to block 77, where the user may browse electronically, in the usual manner. The system may be programmed to warn the user, however, that browsing on-line may substantially increase the cost of the search. When the user indicates that the browsing is complete, the system disconnects from the database, as shown in block 78.

If flag A has not been set, then the system "downloads" the retrieved documents into its own memory, as shown in block 73. By "downloading", it is meant that the system transfers, into its own memory, a copy of the information stored by the remote computer associated with the searched database. After downloading the data, the system terminates the communication link with the database, as shown in block 74.

The user is now able to browse through the retrieved documents electronically, as shown in block 75. Various means of displaying the documents can be used. The simplest method is to allow the user to view the documents from beginning to end, and then to view them from the beginning again, if necessary. But other, more sophisticated viewing techniques could be used, such as global searching, highlighting of relevant passages, and others. Also, the system can be programmed to allow the user to choose to view only abstracts of the documents retrieved. The system may, in addition, be programmed to accept a request that copies of the documents be mailed to the user.

Regardless of the viewing technique used, all examination of retrieved information, in block 75, is done off-line with respect to the remote database. Of course, the user is still on-line with respect to the system itself. However, the cost of browsing on the system is far less than the cost of browsing while on-line with a commercial database. The system does not contain databases of its own; the only searchable information it contains is the material previously downloaded from the database. The advantage of the present invention is that it minimizes the time necessary to be in communication with the remote database. Most of the communication with the user is simply between the user and the system, and thus can be charged at the lower rate.

Another advantage of the invention is that, because the system is "seen" by the databases as a high-volume user of information retrieval services, the costs incurred by the system in searching the various databases are significantly lower than the costs that would be incurred by an individual user. Such reductions in costs can be reflected in the final bill sent to the users of the system.

When the user gives a signal to the system that the browsing has been completed (the signal being given in response to an instruction programmed to appear on the screen during the browsing phase), the system, in test 79, asks the user if more searches are desired. If the answer is yes, the system checks the status of flag B, in test 85. If flag B is set, indicating that the system has selected the database to be searched, the system displays, as indicated in block 83, a list of other databases, if any, that are considered as worthwhile alternatives for searching. Control is then passed back to block 51, where the searching process may be repeated. But this time, the user, having been given the names of the alternative databases, may wish to select one of those databases specifically (by responding affirmatively to test 51) for searching. Of course, the user may still choose to let the system choose a database once again.

If flag B is not set, then the system cannot suggest alternative databases, and control is passed directly to block 51. The search procedure can be started again.

If the user indicates, in test 79, that no more searches are desired, the system proceeds to block 81. The system calculates the time spent and computes the charges. The user's bill is then printed, by printer 32 of FIG. 1, directly on a credit card slip. Note that, in a given search session, the user may have searched a large number of different databases, but that the user receives only one consolidated bill, namely, the credit card statement.

FIG. 3 is a chart which illustrates the method by which the system automatically selects a database, and alternative databases, for seraching. It is understood that the example of FIG. 3 is merely hypothetical, and is greatly simplified for clarity of illustration. FIG. 3 represents the procedure which occurs when the system reaches block 57 in FIG. 2.

FIG. 3a shows a hypothetical display of topics and subtopics for the general subject area of Sciences. The first column of FIG. 3a, labeled "Main Menu" contains only one entry, i.e. Sciences. It is assumed that Sciences is one of the general subject areas presented to the user on the main menu. All of the other major subject areas are assumed to appear on similar charts having subdivisions similar to those of FIG. 3a.

The second column in FIG. 3a, designated as Level 1, represents the first subdivisions of the general topic of Sciences. Level 1, consisting of Engineering, Mathematics, Physics, Chemistry, Medicine, and Psychology, is what would be displayed to the user in block 52 of FIG. 2. This hypothetical example assumes that all areas of the general area of Sciences are included within one of the topics of Level 1.

The third column in FIG. 3a is designated as Level 2, and is what would be shown to the user in block 54 of FIG. 2. In the hypothetical example given, each area of Level 1 is broken down into three narrower areas in Level 2. Again, the areas of Level 2 should be chosen to cover the entire fields represented in Level 1, although the actual coverage shown in the hypothetical example is much more limited.

FIG. 3b illustrates a hypothetical collection of databases. In this example, it is assumed that there are five databases in existence, designated by the letters A, B, C, D, and E. The scope of each database is given explicitly in FIG. 3b.

Following each entry in Level 2 of FIG. 3a is a series of letters. These letters represent the databases identified in FIG. 3b. The letters appear in order of relative significance of the respective database to the subject area selected by the user. For example, suppose the user has selected Sciences from the main menu, Physics from the Level 1 menu, and Elementary Particles from the Level 2 menu. The letters "A, C, D" appear following the subject of Elementary Particles. This designation means that the system automatically chooses database A, containing physics and chemical abstracts, as the database to be searched. The system will, after completion of the search, inform the user that databases C and D (covering general scientific publications and New York Times science sections, respectively), are alternative databases which the user might also want to consider for searching.

It is an important feature of this invention that, regardless of the field in which the user is interested, the system selects a database for searching. Of course, there might not exist a database that is ideal for the specific needs of the user. But the system is programmed to select at least one database that is deemed to be the most helpful in the selected subject area.

The "tree" structure illustrated in FIG. 3a is pre-programmed into the computer. It is the result of analysis of the content of various databases and represents the judgment of the programmer. But it is clear that, once the "tree" is programmed, the system automatically chooses a database, without significant further computation, as soon as the user has made a selection from Level 2.

It is noted that the same database may be chosen by the system for more than one topic. For example, the system in the example of FIG. 3 chooses database A for Elementary Particles as well as for Metallurgy. The reason for the duplication is simply the paucity of databases in the example. If, as in actual practice, the databases available are more numerous (and therefore more specialized), there would be fewer search topics which would be associated with duplicate databases.

The example given in FIG. 3a is necessarily simplified. It should be recognized that the few topics shown in Level 2 do not in fact cover the entire field of the Sciences. In actual practice, there would need to be many more than three possible choices in this level. Also, additional levels may be added, to enhance the precision of database selection, without departing from the scope of the invention.

Table 1 illustrates the method by which the system translates a search request of the user into the language appropriate to the database to be searched. Table 1 thus defines the procedure referenced by block 65 of FIG. 2.

TABLE 1

|  | Present Invention | BRS | DIALOG | INFOLINE | NLM |
|---|---|---|---|---|---|
| Logical | ( ) | ( ) | ( ) | ( ) | ( ) |
| Connectors | AND | AND | NOT | AND | AND |
|  | OR | OR | AND | AND NOT | OR |
|  | NOT | NOT | OR | OR | AND NOT |
| Truncation | / | $ | ? | * | # |
| Proximity | (space between words) | ADJ | (W) | Wn | TS |

Table 1 illustrates the language used by the system of the present invention as well as the languages used by four other databases. The language of the present invention is represented by the first column in the table. The remaining four columns represent the four other databases. BRS is a service of Bibliographic Retrieval Services, Inc., Latham, N.Y. DIALOG is a service of Dialog Information Services, Inc., Palo Alto, Calif. INFOLINE is a service of Pergamon Press, London, England. NLM is a service of the U.S. Library of Medicine, Bethesda, Md.

Each row in Table 1 represents a different aspect of the database language. The row labeled "Logical Connectors" identifies the logical connectors that are used to join words in a search request. The order in which these connectors appear indicates the hierarchy of the operations. For example, in the language of the present invention, groups of words in parentheses are resolved first. Words separated by AND are resolved before words separated by OR, and so on. Note that the hierarchy of operations is not, in general, the same for all databases.

The row entitled "Truncation" gives the operator which is used to search variants of a given word. For example, in the present invention, if the user enters the word "communi/", the system will retrieve all words beginning with "communi", including communications, community, communicable, etc. This operation is known as truncation, and the truncation operator in the present invention is a slash (/). The truncation operator for the other databases takes other forms, as shown.

The row entitled "Proximity" gives information on proximity connectors. A proximity connector is a symbol connecting two specified words, and which calls for a search for documents wherein the two specified words are separated by a given number of other words. In the embodiment of the present invention described herein, the user is not given the option of specifying such variable proximity. However, if the user enters two words, separated by a space, the system must interpret the words as if they were separated by a proximity connector, i.e. a proximity of zero words. In short, the system must translate the search request into a request which specifies that the database should be searched for documents wherein the given words appear together. The proximity connectors shown for the other databases accomplish this task.

It is understood that the invention may be modified to allow more flexibility in the search request language entered by the user. Provision can be made for more elaborate proximity connectors, for example. However, it is an aim of the present invention to keep the searching language reasonably simple, thereby facilitating its use by a large variety of types of users.

In addition to the information shown in Table 1, the translation of a search request will, in general, contain much more information. The system must specify, to the remote database, the particular file in which a search is to be made. The system must also specify what formats are to be used for printing the retrieved information. Each database has its own syntax for choosing such options. The system is therefore programmed to append automatically the information that the user needs to obtain usable results from the search. Such information, of course, does not depend on the words which the user desires to search in the database. This formatting information appears regardless of the content of the search request. It is an important feature of the invention that virtually all such parameters required in communicating with the remote database need not be known by the user. The system supplies all necessary parameters, which are previously stored in its memory.

One can see, from Table 1, how the system translates complicated search requests into the language of the individual databases. For example, suppose that the user enters the following search request:

NEUTRON STAR OR BLACK HOLE AND (DOPPLER OR RED SHIFT) NOT GRAV/WAVE

The above search request means that the user wants all documents containing the words NEUTRO STAR or BLACK HOLE, and also DOPPLER or RED SHIFT, but not GRAV/WAVE, where the slash indicates that any word beginning with GRAV will satisfy the above condition. In the language of BRS, the above request will appear as follows:

NEUTRON ADJ STAR OR BLACK ADJ HOLE AND (DOPPLER OR RED ADJ SHIFT) NOT GRAV$ ADJ WAVE

In the language of DIALOG, the above request would be translated into the following:

NEUTRON (W) STAR OR BLACK (W) HOLE AND (DOPPLER OR RED (W) SHIFT) NOT GRAV? (W) WAVE

Translation of the search request into the language of the other databases is accomplished in a similar manner.

Occasionally, a database does not contain a type of connector (such as NOT) which the user wants to use. In that case, the system is programmed to display an error message, requiring the user to reformulate the search request.

The system is also programmed to take into account the hierarchy of operations of the logical connectors. For example, suppose that the user enters the following search request:

A AND B OR C NOT D AND E

The letters A, B, C, D, and E represent different words for which the user wishes to search. The system interprets this request according to its predetermined hierarchy of operations. The above request is therefore interpreted as:

((A AND B) OR C) NOT (D AND E)

To translate this search request into the language of DIALOG, for example, the system may be programmed to insert the parentheses as shown above. Parentheses can be used in virtually any database to alter the normal hierarchy of operations. By including the parentheses explicitly, errors in interpretation of the search request can be avoided.

Alternatively, the system may be programmed to translate the above search request into the following:

A AND B OR C NOT (D AND E)

It is apparent that, given the stated hierarchy in Table 1 for DIALOG, the above search request is interpreted in the same manner as the search request given above.

It is thus another important feature of the invention that the hierarchy of operations may be taken into account in translating the search request into the language of the selected database.

The system described herein can be modified in many ways. For example, the system can aid a person who does not have a personal computer, and who does not have equipment for transmitting digital data over telecommunications lines. Such a person could telephone a human operator of the system, orally specify an area of interest, and the operator could respond to the questions asked by the system, as described above. The operator could be a person without much knowledge of commercial databases, in which case the operator could allow the system to make its own selections, in the manner described above in connection with a user having a data link. Or, the operator could be an expert in the field of databases, in which case the operator could select a particular database in response to a user's oral request, and could even elect to remain on-line with that database. In short, the fully automated procedure described above can be made semi-automatic to accommodate those users without the necessary equipment.

The present invention can be used to advantage by the novice and the expert alike. The advantages to the novice are clear: the system makes all the difficult choices, and does all the "dirty work." The user not only is not required to learn the searching language of the database, but also does not need to memorize passwords, print format commands, and other information which is supplied automatically by the system of the present invention.

For the expert, the system allows the user to gain access to many databases using only one credit card, and without the need to enter a large number of passwords. The expert user can thus retain control over the nature of the search, but can enjoy the benefits of searching with one credit card.

It is apparent that the objects of the invention are fulfilled by the above disclosure. As explained above, however, the invention can be modified in many ways. The number of computers available to service user search requests can be varied. The number of databases to be searched can be changed, as long as a proper translation is made from the language of the system to the language of the database. As shown above, there are many alternative ways of translating the search requests. The particular subdivision of subject areas can be varied, especially to reflect the advent of more (and more specialized) databases. The degree of automation of the system can be adjusted to fit the needs of different users. These and other modifications are to be deemed within the spirit and scope of the following claims.

What is claimed is:

1. A system for retrieving information from a plurality of remote databases, the databases having at least two different languages, and for supplying said information to a remote user, comprising:
  (a) a programmed digital computer, connected by a first modem to an incoming telecommunications line, the computer thereby being capable of receiving instructions from the remote user,
  (b) a second modem, connected between the computer and an outgoing telecommunications line, the second modem including automatic telephone dialing means for establishing communication between the computer and any of said plurality of remote databases,
  (c) the computer comprising means for automatically selecting one of said databases in response to a specification of a subject of interest by the user, the computer comprising means for accepting a search request from the user, the computer also comprising means for translating the search request received from the user into the language of the database selected by the computer, the computer also comprising means for transmitting the translated search request to the selected database and for downloading, to the memory of the computer, the information obtained from the database after the search is completed, and for transmitting the information to the user.

2. The system of claim 1, further comprising a printer means, connected to be operated by the computer, for printing a bill for the time spent by the user, in response to a command from the computer.

3. The system of claim 2, further comprising auxiliary storage means, connected to the computer.

4. A method of supplying information to a user from one of a plurality of databases, the databases having at least two different languages, comprising the steps of:
  (a) receiving a specification, from the user, of the subject in which the user desires to search.
  (b) automatically selecting one of said plurality of databases, the selected database being that database which most closely matches the specification of the user, of the databases which are available,
  (c) accepting a search request from the user, the search request comprising at least one word for which the user desires to search in the selected database,
  (d) translating the search request into the language of the selected database,
  (e) gaining access to the selected database and searching the database according to the translated search request,
  (f) downloading the information received from the database, and
  (g) terminating the connection with the selected database.

5. The method of claim 4, wherein the terminating step is followed by the step of displaying, to the user, the information retrieved during the search.

6. The method of claim 5, wherein the receiving step is preceded by the step of verifying credit card information supplied by the user, and terminating communication with the user if the credit card information is not valid.

7. The method of claim 6, wherein the displaying step is followed by the steps of calculating the charges incurred by the user during the searching session, and printing a credit card bill for submission to the user.

8. A system for retrieving information from a plurality of databases, the databases having at least two different languages, and for supplying said information to a user, comprising:
(a) means for receiving a specification of a subject in which the user is interested,
(b) means for automatically selecting one of said databases in response to said specification by the user,
(c) means for accepting a search request from the user, the search request comprising at least one word which is to be searched in the selected database,
(d) means for translating the user's search request into the language of the selected database,
(e) means for gaining access to the selected database, and
(f) means for downloading, into the system, the information obtained from the selected database.

9. The system of claim 8, wherein the receiving means comprises a programmed digital computer, the computer comprising means for presenting the user with a series of choices of subjects and for receiving responses from the user, to the choices presented.

10. The system of claim 9, wherein the selecting means comprises a programmed digital computer, the computer being programmed to select at least one database for every possible choice of subject made by the user.

11. The system of claim 10, wherein the computer is further programmed to select alternative databases for searching.

12. A system for retrieving information from a plurality of remote databases, and for supplying said information to a user, the databases having at least two different languages, comprising,
(a) a programmed digital computer,
(b) a modem, connected between the computer and an outgoing telecommunications line, wherein the modem comprises means for establishing communication between the computer and any of said plurality of remote databases,
(c) the computer comprising means for automatically selecting one of said databases in response to a specification of a subject of interest by the user, and for receiving a search request from the user, the computer also comprising means for tanslating the search request received from the user into the language of the database selected by the computer, the computer also comprising means for transmitting the translated search request to the selected database and for downloading the information obtained from the database, into the memory of the computer, after the search is completed.

13. The system of claim 12, wherein the computer is programmed to select at least one database to be searched regardless of what area is specified by the user.

14. A method of supplying information to a remote user from any of a plurality of commercial databases, the databases having at least two different languages, comprising the steps of:
(a) requesting, from the user, a specification of one of a plurality of choices of subjects of interest, in which subject the user desires to search, said plurality of choices being programmed to represent a comprehensive list of subjects,
(b) accepting said specification from the user,
(c) automatically selecting one of said plurality of databases, the selection step being made by a programmed digital computer, the computer being programmed to select that database which most closely matches the specification of the user, of the databases which are available,
(d) accepting a search request from the user, the search request comprising at least one word for which the user desires to search in the selected database,
(e) translating the search request into the language of the selected database,
(f) gaining access to the selected database and searching the database according to the translated search request,
(g) downloading the information received from the database, into the memory of the computer,
(h) terminating the connection with the selected database, and
(i) interactively displaying the information received from the search to the user, whereby the displaying step is performed while the user is off-line with respect to the database.

15. The method of claim 14, further comprising the step of automatically suggesting, to the user, at least one additional database for searching.

* * * * *